Aug. 15, 1939.     O. H. FOWLER     2,169,524

FLUID-PRESSURE PRODUCING DEVICE

Filed Dec. 18, 1937     3 Sheets-Sheet 1

INVENTOR.
OWEN H. FOWLER
BY
ATTORNEY.

Aug. 15, 1939.  O. H. FOWLER  2,169,524
FLUID-PRESSURE PRODUCING DEVICE
Filed Dec. 18, 1937   3 Sheets-Sheet 2
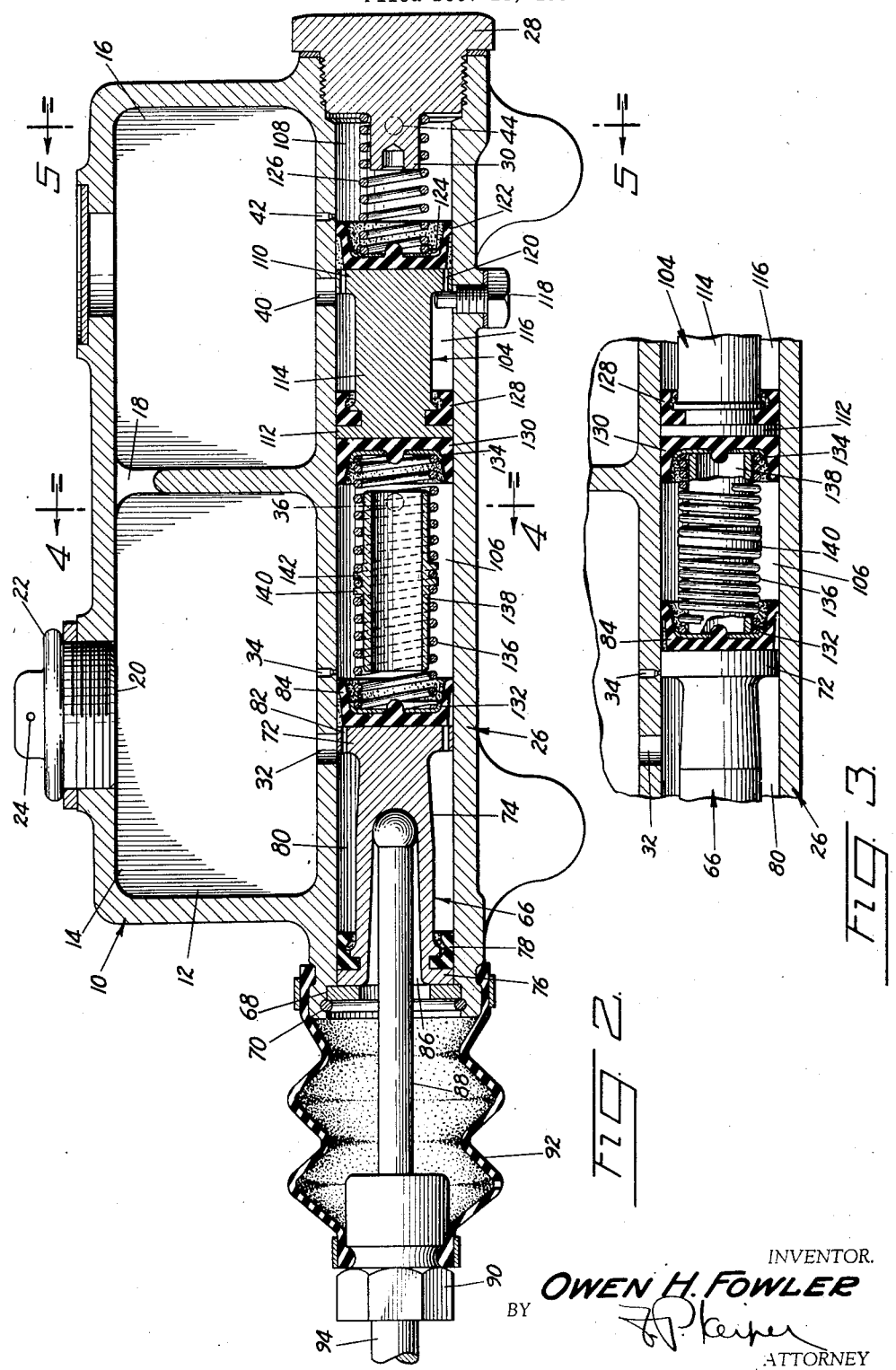
INVENTOR.
OWEN H. FOWLER
BY
ATTORNEY Aug. 15, 1939.   O. H. FOWLER   2,169,524
FLUID-PRESSURE PRODUCING DEVICE
Filed Dec. 18, 1937   3 Sheets-Sheet 3

INVENTOR.
OWEN H. FOWLER
BY
ATTORNEY

Patented Aug. 15, 1939

2,169,524

UNITED STATES PATENT OFFICE

2,169,524

FLUID-PRESSURE-PRODUCING DEVICE

Owen H. Fowler, Detroit, Mich., assignor to Hydraulic Brake Company, Detroit, Mich., a corporation of California Application December 18, 1937, Serial No. 180,627

10 Claims. (Cl. 60—54.5)

This invention relates to fluid pressure producing devices.

Broadly the invention comprehends a fluid pressure producing device for operating separate braking systems, one for actuating the brakes associated with the front wheels of a vehicle, and another for actuating the brakes associated with the rear wheels of the vehicle.

An object of the invention is to provide a duplex fluid pressure producing means, a single actuator for operating the pressure producing means in unison, means compensating for a differential of pressure in the pressure producing means, and means for maintaining one of the pressure producing means operative in the event of failure of the other.

A feature of the invention is a cylinder having therein an actuating piston, a floating piston dividing the cylinder into two chambers each connected to a pair of brakes, means intermediate the pistons operative after the maximum allowable effective movement of the actuating piston to cause the pistons to move in unison, and a stop for limiting the movement of the floating piston.

Another feature of the invention is an actuating piston and a floating piston, and a spring interposed between the pistons supporting a thrust member.

Other objects and features of the invention will appear from the following description taken in connection with the drawings forming a part of this specification, and in which:

Fig. 2 is a vertical sectional view of the fluid pressure producing device illustrating the pistons in the position of rest;

Fig. 3 is a fragmentary view illustrating the pistons at the end of the effective stroke of the actuating piston;

Figure 1:
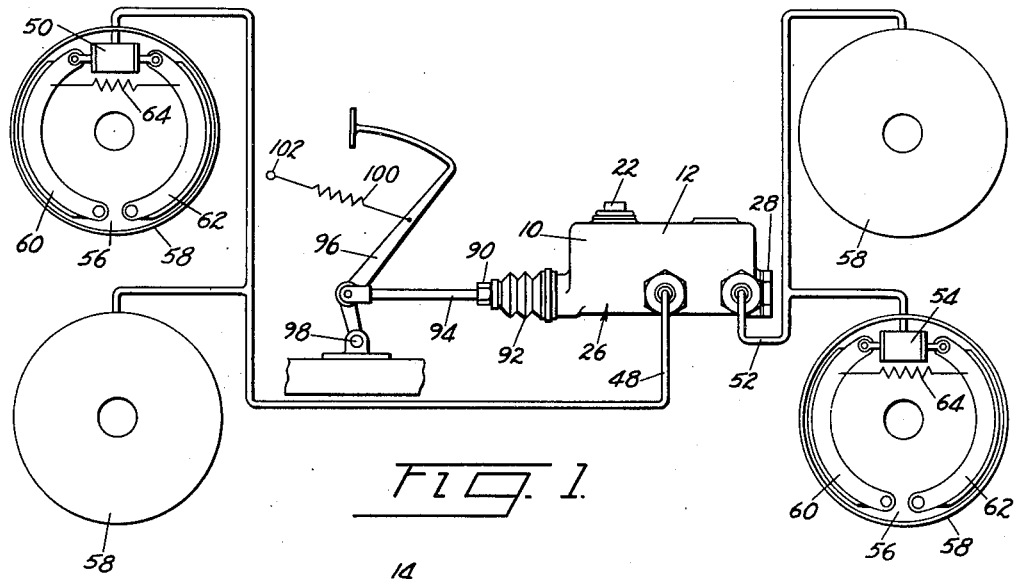
Fig. 1 is a diagrammatical illustration of a fluid pressure braking system embodying the invention.

Referring to the drawings for more specific details of the invention, 10 represents generally a fluid pressure producing device including a reservoir 12 having two compartments 14 and 16 communicating with one another as at 18. The reservoir has a filling opening 20 normally closed as by a plug 22, and the plug is provided with openings 24 for venting the reservoir to the atmosphere.

A cylinder 26 formed at the base of the reservoir has one of its ends closed as by a head 28 having an inwardly extending projection 30, the object of which will hereinafter appear. The cylinder has spaced ports 32 and 34, communicating with the compartment 14 of the reservoir, and a discharge port 36 controlled as by a two-way valve 38. The cylinder also has spaced ports 40 and 42, communicating with the compartment 16 of the reservoir, and a discharge port 44 controlled as by a two-way valve 46.

A fluid pressure delivery pipe or conduit 48 connected to the two-way valve 38 has branches connected respectively to fluid pressure actuated motors 50 arranged for the actuation of the friction elements of a pair of brakes, and, correspondingly, a fluid pressure delivery pipe or conduit 52 connected to the valve 46 has branches connected respectively to fluid pressure actuated motors 54 arranged for the actuation of the friction elements of another pair of brakes.

Preferably the fluid pressure actuated motors are arranged in pairs, one pair for actuating the friction elements of the brakes associated with the front wheels of a vehicle, and another pair for actuating the friction elements of the brakes associated with the rear wheels of the vehicle.

The brakes may be of conventional type including a fixed support or backing plate 56 adapted to be secured to an axle housing or to an axle, a rotatable drum 58 associated with the backing plate adapted to be secured to a wheel, a pair of corresponding interchangeable friction elements or shoes 60 and 62 pivoted on the backing plate, a retractile spring 64 connecting the shoes, and a motor corresponding to the motors 50 and 54 mounted on the backing plate between the shoes 60 and 62 and operative to actuate the shoes into engagement with the drum 58 against the resistance of the retractile spring 64.

A piston 66, reciprocable in the open end of the cylinder 26, is retained against displacement by a washer 68 seated on an annular shoulder in the open end of the cylinder and secured in place by a retaining ring 70 seated in a groove in the wall of the cylinder. The piston has a head 72, a body portion 74, and a skirt 76. The skirt has fitted thereon a sealing cup 78 for inhibiting seepage of fluid from the cylinder past the piston; the body 74 is reduced in cross-section so as to provide, in conjunction with the wall of the cylinder, an annular chamber 80 communicating with the compartment 14 of the reservoir by way of the port 32; and the head 72 of the piston has a plurality of spaced passages 82 therethrough providing communications between the annular chamber 80 and that portion of the cylinder forward of the piston. A collapsible sealing cup 84 supported on the head of the piston controls the passages.

A recess 86 in the body of the piston 66 receives one end of a thrust pin 88 having on its other end a coupling 90 connected by a flexible boot 92 to the open end of the cylinder 26 for the exclusion of dust and other foreign substances, and a rod 94 connects the coupling to a foot pedal lever 96 pivotally mounted as at 98 and connected as by a retractile spring 100 to a fixed support 102.

A floating piston 104 is fitted for reciprocation in the cylinder 26 between the discharge ports 36 and 44, and divides the cylinder 26 into two chambers 106 and 108, one constituting that portion of the cylinder forward of the piston 66, and the other constituting that portion of the cylinder forward of the floating piston 104. This floating piston has a head 110 on one of its ends and a head 112 on its other end. The piston also has a reduced body portion 114 providing, in conjunction with the wall of the cylinder, an annular chamber 116 communicating with the compartment 16 of the reservoir by way of the port 40, and mounted in the wall of the cylinder is a stop 118 extending into the chamber 116 and adapted to support the piston 104 when in its retracted position.

The head 110 of the floating piston has a plurality of spaced passages 120 therethrough providing communications between the annular chamber 116 and the chamber 108, or that portion of the cylinder forward of the floating piston. A collapsible sealing cup 122 supported on the head 110 controls the passages 120, and a spring seat 124 suitably secured in the bottom of the cup receives one end of a spring 126, having its other end sleeved on the extension 30 and seated on the head 28. The spring seat 124 is preferably slightly heavier than the conventional, so that at the end of the maximum allowable stroke of the piston the spring seat may abut the extension 30 and support the piston without injury to the sealing cup 122.

Supported on the back of the head 112 of the floating piston is a sealing cup 128 for inhibiting seepage of fluid from the annular chamber 116, past the head 112, and supported on the head 112 is a sealing cup 130 for inhibiting seepage of fluid from the chamber 106 past the head 112.

The sealing cups 84 and 130 have suitably secured in their respective bottoms relatively heavy spring rests 132 and 134, and interposed between these seats is a return spring 136 for the actuating piston. A sleeve 138 fitted on the spring is adapted to engage the respective spring rests 132 and 134 upon attaining the maximum allowable movement of the actuating piston 66. The sleeve has a central flange 140 provided with a thread or groove 142 of a different pitch than that of the convolutions of the spring, so that when the sleeve is fitted on the spring, with at least one convolution of the spring in the groove, there is provided a binding action between the spring and the sleeve, serving to retain the sleeve in a centralized position with respect to the overall length of the spring.

Figure 6:
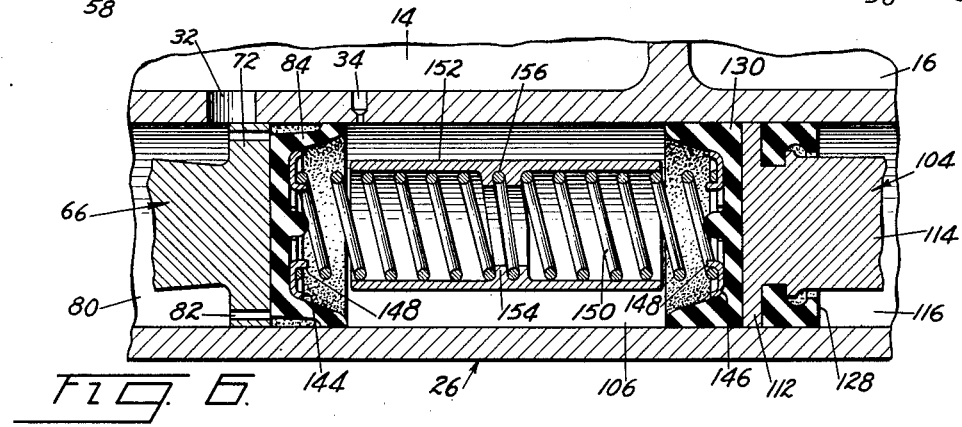
Fig. 6 is a fragmentary view illustrating a modified form of the invention.

A modification of the return spring and the sleeve is illustrated in Fig. 6. In this embodiment, the sealing cups 84 and 130 have suitably secured in their respective bottoms fairly heavy spring seats 144 and 146, each having tongues 148 struck therefrom so as to enter the respective ends of a spring 150 interposed between the seats. A sleeve 152 has an internal flange 154 substantially centrally of its length, and this flange has a thread or groove 156 of a different pitch than that of the convolutions of the spring, so that when the sleeve is threaded on the spring there will be provided a clamping action between the spring and the sleeve, serving to retain the sleeve centrally of the spring. In this modified form of the invention, the respective ends of the sleeve abut the spring rests 144 and 146 upon attaining the maximum allowable movement of the actuating piston.

Figure 7:
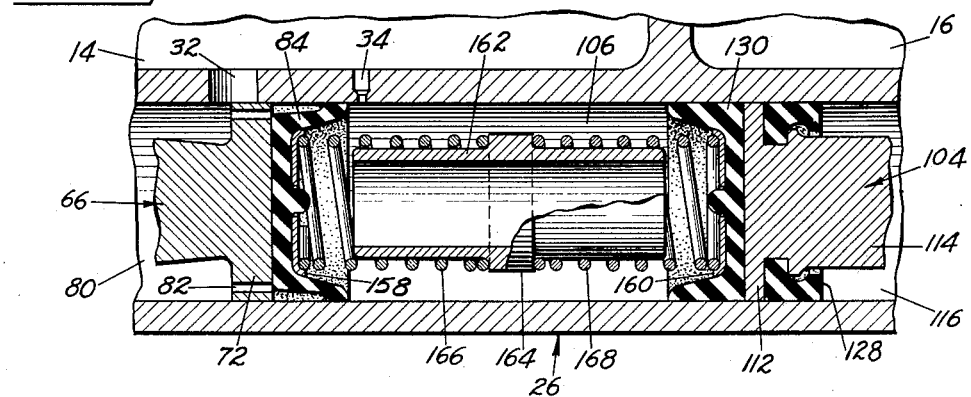
Fig. 7 is a fragmentary view illustrating another modified form of the invention.
Figure 4:
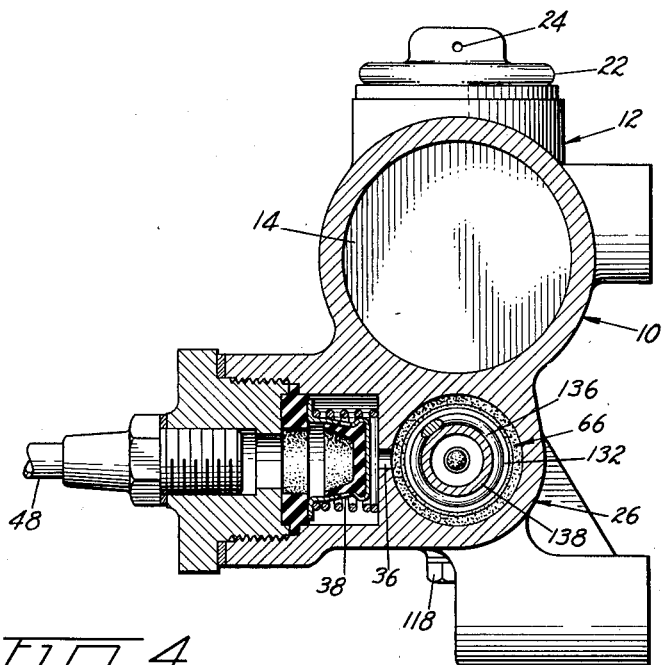
Fig. 4 is a cross-sectional view substantially on line 4—4, Fig. 2.
Figure 5:
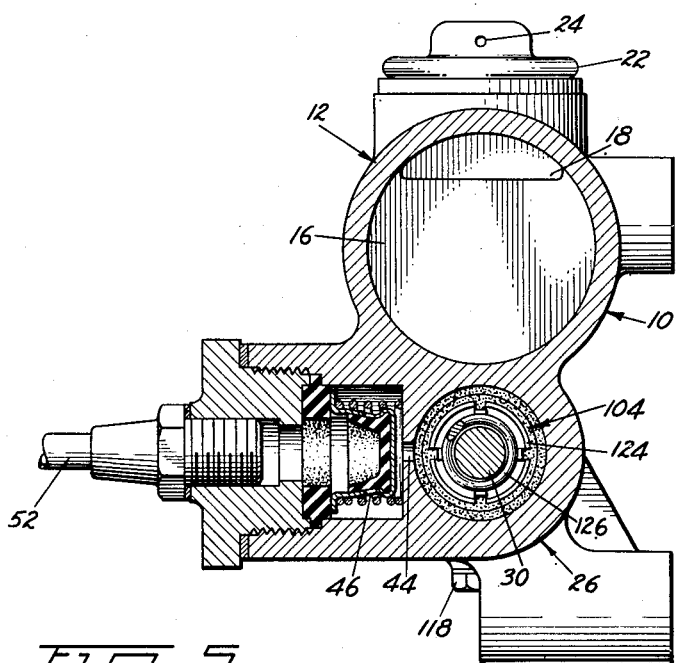
Fig. 5 is a cross-sectional view substantially on line 5—5, Fig. 2.

Another modification of the return spring and sleeve is illustrated in Fig. 7. In this embodiment of the invention, the sealing cups 84 and 130 have suitably secured in their respective bottoms heavy spring seats 158 and 160. A sleeve 162, positioned in the cylinder, has arranged centrally thereon a circumferential flange 164, and sleeved on the respective ends of the sleeve intermediate the flange 164 and the respective spring seats 158 and 160 are return springs 166 and 168.

In a normal operation, assuming that the system is properly installed and filled with suitable fluid, upon depressing the foot pedal lever 96 to apply the brakes, force is transmitted from the lever, through the rod 94 and thrust pin 88, to the piston 66, resulting in movement of the piston on its compression stroke. During the initial movement of the piston 66 on its compression stroke, the sealing cup 84 on the head of the piston closes the port 34, and, thereafter, as the piston advances, pressure is imposed on the fluid in that portion of the cylinder forward of the piston 40 or in the chamber 106, resulting in displacement of fluid from the chamber 106, through the port 36, past the two-way valve 38 and through the fluid pressure delivery pipe or conduit into the fluid pressure actuated motors 50, causing energization of the motors 50, and resulting in movement of the shoes 60 against the resistance of the retractile springs 64 into engagement with the drums 58.

Concomitantly with the operation hereinabove described, the fluid under pressure in that portion of the cylinder forward of the piston 66, or in the chamber 106, imposes pressure on the head 112 of the floating piston 104, resulting in movement of this piston on its compression stroke. During the initial movement of the floating piston 104 on its compression stroke, the sealing cup 122 on the head 110 of the piston closes the port 42, and, thereafter, as the piston advances on its compression stroke, pressure is imposed on the fluid in that portion of the cylinder forward of the head 110 of the piston 104, or in the chamber 108, resulting in displacing fluid from the chamber 108, through the port 44, past the two-way valve 46, and through the fluid pressure delivery pipe or conduit into the fluid pressure actuated motors 54, causing energization of the motors 54 and resulting in movement of the shoes 60 connected to these motors against the resistance of the retractile springs 64 into engagement with the drums 58.

Under normal conditions, variations of pressure may be produced in the respective chambers 106 and 108, due to a differential in the adjustment of the respective pairs of brakes associated with the front and rear wheels of the vehicle, and movement of the floating piston 104 compensates for this differential of pressures so that both pairs of brakes may be applied with equal force and effect.

Upon release of the foot pedal lever 96 at the conclusion of a braking operation, the lever is returned to its retracted position under the influence of the retractile spring 100, and retracts the rod 94 connected to the lever and the thrust pin 88 connected to the rod. This results in release of the piston 66, accompanied by release of pressure on the fluid in the cylinder, and, consequently, release of the piston 104. Upon release of the pistons 66 and 104, the return springs 126 and 136 become effective to return the pistons to their retracted positions. As the pistons 66 and 104 return to their retracted positions, partial vacuums are created in the chambers 106 and 108. This results in drawing fluid from the compartments 14 and 16 of the reservoir, through the ports 32 and 40, into the annular chambers 80 and 116, thence through the passages 82 in the head of the piston 66, past the cup 84, into the chamber 106, and through the passages 120 in the head of the piston 110 past the cup 122 into the chamber 108, completely filling the chambers 106 and 108.

During this period fluid is returning to the chambers 106 and 108 from the fluid pressure actuated motors 50 and 54, and the fluid pressure delivery pipes 48 and 52 connecting the motors to the chambers 106 and 108, under the influence of the retractile springs connecting the friction elements of the respective brake structures. Under these conditions, the chambers 106 and 108 receive fluid in excess of that required to fill the cylinders, and such excess fluid is returned to the reservoir by way of the compensating ports 34 and 42.

The maximum allowable effective movement of the pistons 66 and 104 is substantially seven-eighths of an inch each. This movement of the pistons is adequate to displace sufficient volume of fluid from the chambers 106 and 108 through the discharge ports thereof and the fluid pressure delivery pipes connected to the discharge ports into the fluid pressure actuated motors to effectively actuate both sets of brakes, and any slight differential of pressures created in the chambers 106 and 108 is compensated for by movement of the floating piston 114 so as to equalize the brakes.

In the event of failure of the braking system for actuating the brakes associated with the front wheels of the vehicle, the actuating piston 66 moving on its compression stroke depresses the return spring 136 sufficiently to seat the respective ends of the sleeve 138 carried by the spring on the spring seats 132 and 134 in sealing cups 84 and 134 on the heads of the actuating piston 66 and floating pistons 114, and, thereafter, the pistons move as a single unit. The actuating piston 66 is non-effective, except for the transmission of force therefrom through the sleeve 138 to the floating piston 130, and the floating piston is actuated with the same effectiveness as in a normal operation wherein it is actuated by pressure on the fluid between the pistons. In subsequent operations, the piston 66 remains ineffective for producing pressure on the fluid in the chamber forward thereof, but serves merely as a mechanical means for actuating the floating piston which operates as under normal conditions.

In the event of failure of the braking system for actuating the brakes associated with the rear wheels of the vehicle, the floating piston, moving on its compression stroke, compresses the return spring 126 sufficiently to seat the concentric extensions 30 on the head 28 of the cylinder on the spring seat 124 in the sealing cup 122 on the head 110 of the floating piston so as to retain the piston against further movement. During this movement of the floating piston, the actuating piston, having followed through, maintains a pressure on the fluid forward thereof, and hence in the braking system actuated thereby. In subsequent operations, the floating piston is moved by fluid under pressure to its seat on the extension 30 as the actuating piston 66 advances on its compression stroke, and is held on its seat by the pressure on the fluid between the pistons, to the end that the braking system for the front wheels may be actuated as under normal conditions.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a reservoir having two compartments, a cylinder having ports communicating with the respective compartments and spaced discharge ports, a piston reciprocable in the cylinder, a floating piston in the cylinder between the discharge ports, a spring interposed between the piston and the floating piston, and a sleeve supported on the spring.

2. A fluid pressure producing device comprising a reservoir having two compartments, a cylinder supplied from the reservoir having one end closed and its other end open and spaced discharge ports, an actuating piston in the open end of the cylinder, a floating piston in the cylinder between the discharge ports, a spring between the closed end of the cylinder and the floating piston, a spring between the floating piston and the actuating piston, and a sleeve supported on the last-mentioned spring.

3. A fluid pressure producing device comprising a reservoir having two compartments, a cylinder supplied from each of the compartments having spaced discharge ports, a head on one end of the cylinder having an extension projecting into the cylinder, an actuating piston reciprocable in the open end of the cylinder, means on the actuating piston for controlling the flow of fluid from one of the compartments to the head of the piston, a floating piston in the cylinder between the discharge ports, means on the floating piston for controlling the flow of fluid from the other compartment to the forward head of the floating piston, a spring between the head and the floating piston embracing the extension on the head, a spring between the floating piston and the actuating piston, and a sleeve threaded on the last-mentioned spring.

4. A fluid pressure producing device comprising a cylinder, spaced pistons movable therein, a spring interposed between the pistons, and a sleeve supported on the spring.

5. A fluid pressure producing device comprising a cylinder, spaced pistons movable therein, a spring interposed between the pistons, and a sleeve threaded on the spring.

6. A fluid pressure producing device comprising a reservoir, a cylinder supplied therefrom, spaced pistons movable in the cylinder, a coiled spring interposed between the pistons, and a sleeve in the spring having a part interlocked therewith.

7. A fluid pressure producing device comprising a reservoir, a cylinder supplied therefrom, spaced pistons movable in the cylinder, a spring interposed between the pistons, and a sleeve on the spring having a flange provided with a groove receiving at least one of the convolutions of the spring.

8. A fluid pressure producing device comprising a reservoir, a cylinder supplied therefrom, spaced pistons movable in the cylinder, a coiled spring interposed between the pistons, a sleeve telescoping the spring, a flange on the sleeve having a groove of a different pitch than the pitch of the convolutions of the spring and receiving at least one of the convolutions of the spring.

9. A fluid pressure producing device comprising a reservoir, a cylinder supplied therefrom, spaced pistons in the cylinder, sealing cups supported on the heads of the pistons in oppositely disposed relation to one another, spring seats secured in the cups, a coiled spring interposed between the seats, a sleeve telescoping the spring, a flange on the sleeve having a groove of a different pitch than the pitch of the convolutions of the spring and receiving at least one of the convolutions of the spring.

10. A fluid pressure producing device comprising a reservoir, a cylinder supplied therefrom, a floating piston in the cylinder dividing the cylinder into two chambers each having a discharge port, means limiting movement of the floating piston, a return spring for the floating piston, an actuating piston in the cylinder, means for moving the actuating piston on its compression stroke, a return spring for the actuating piston interposed between the actuating piston and the floating piston, and a sleeve supported on the spring having a part interlocked with the spring.

OWEN H. FOWLER.